(12) United States Patent
Wyschogrod et al.

(10) Patent No.: US 6,856,981 B2
(45) Date of Patent: Feb. 15, 2005

(54) HIGH SPEED DATA STREAM PATTERN RECOGNITION

(75) Inventors: Daniel Wyschogrod, Newton, MA (US); Alain Arnaud, Newton, MA (US); David Eric Berman Lees, Lexington, MA (US); Leonid Leibman, Weston, MA (US)

(73) Assignee: SafeNet, Inc., Belcamp, MD (US)

( * ) Notice: Subject to any disclaimer, the term of this patent is extended or adjusted under 35 U.S.C. 154(b) by 369 days.

(21) Appl. No.: 10/005,462

(22) Filed: Dec. 3, 2001

(65) Prior Publication Data

US 2003/0051043 A1 Mar. 13, 2003

Related U.S. Application Data

(60) Provisional application No. 60/322,012, filed on Sep. 12, 2001.

(51) Int. Cl.[7] .............................................. G06F 17/00
(52) U.S. Cl. .......................................................... 706/48
(58) Field of Search ............................................ 706/48

(56) References Cited

PUBLICATIONS

Clemens etal, "Model Group Indexing for Recognition", IEEE Computer Society Conference on Computer Vision and Pattern Recognition, Jun. 1991.*

Uga etal, "A Fast and compact Longest Match Prefix Look–Up Method Using Pointer Cache for Very Long Network Address", IEEE International Conference on Computer Communications and Networks, Oct. 1999.*

* cited by examiner

Primary Examiner—George Davis
(74) Attorney, Agent, or Firm—Gerald T. Bodner

(57) ABSTRACT

A system and method in accordance with the present invention determines in real-time the portions of a set of characters from a data or character stream which satisfies one or more predetermined regular expressions. A Real-time Deterministic Finite state Automaton (RDFA) ensures that the set of characters is processed at high speeds with relatively small memory requirements. An optimized state machine models the regular expression(s) and state related alphabet lookup and next state tables are generated. Characters from the data stream are processed in parallel using the alphabet lookup and next state tables, to determine whether to transition to a next state or a terminal state, until the regular expression is satisfied or processing is terminated. Additional means may be implemented to determine a next action from satisfaction of the regular expression.

31 Claims, 8 Drawing Sheets

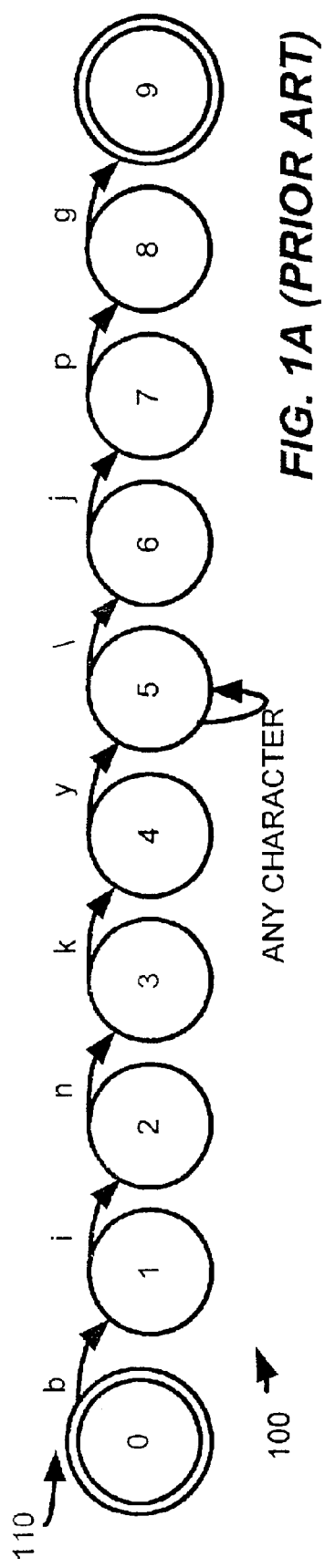
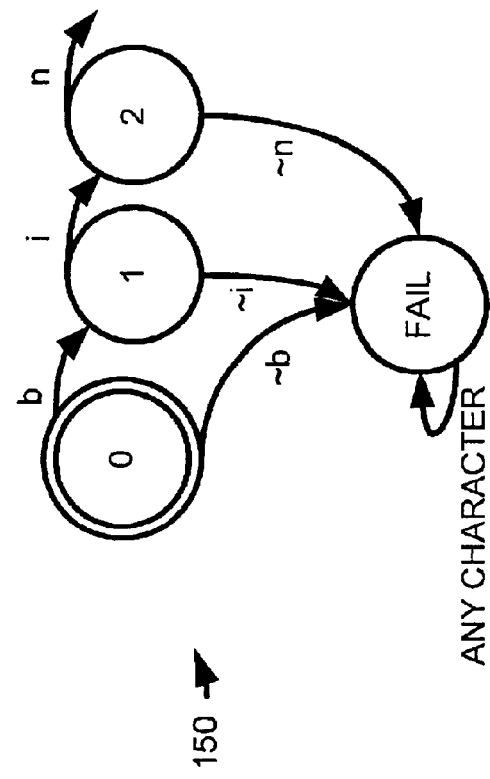
FIG. 1A (PRIOR ART)
FIG. 1B (PRIOR ART)

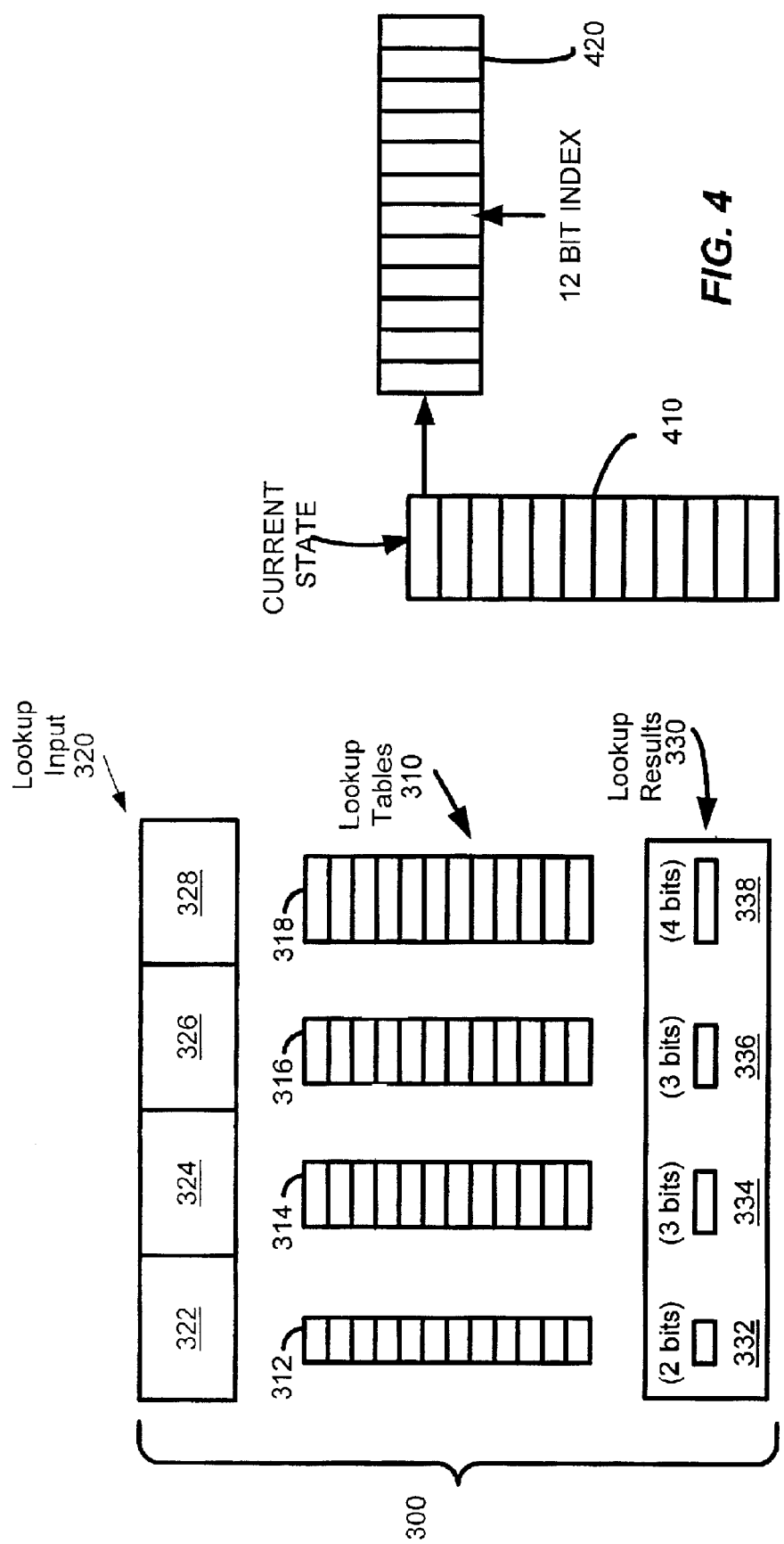

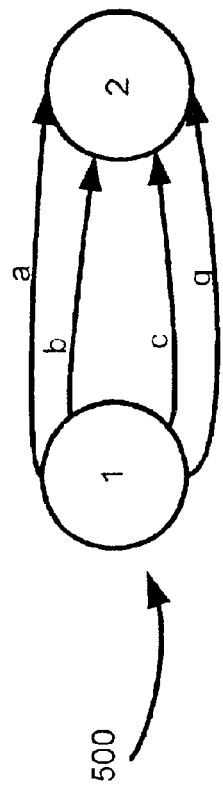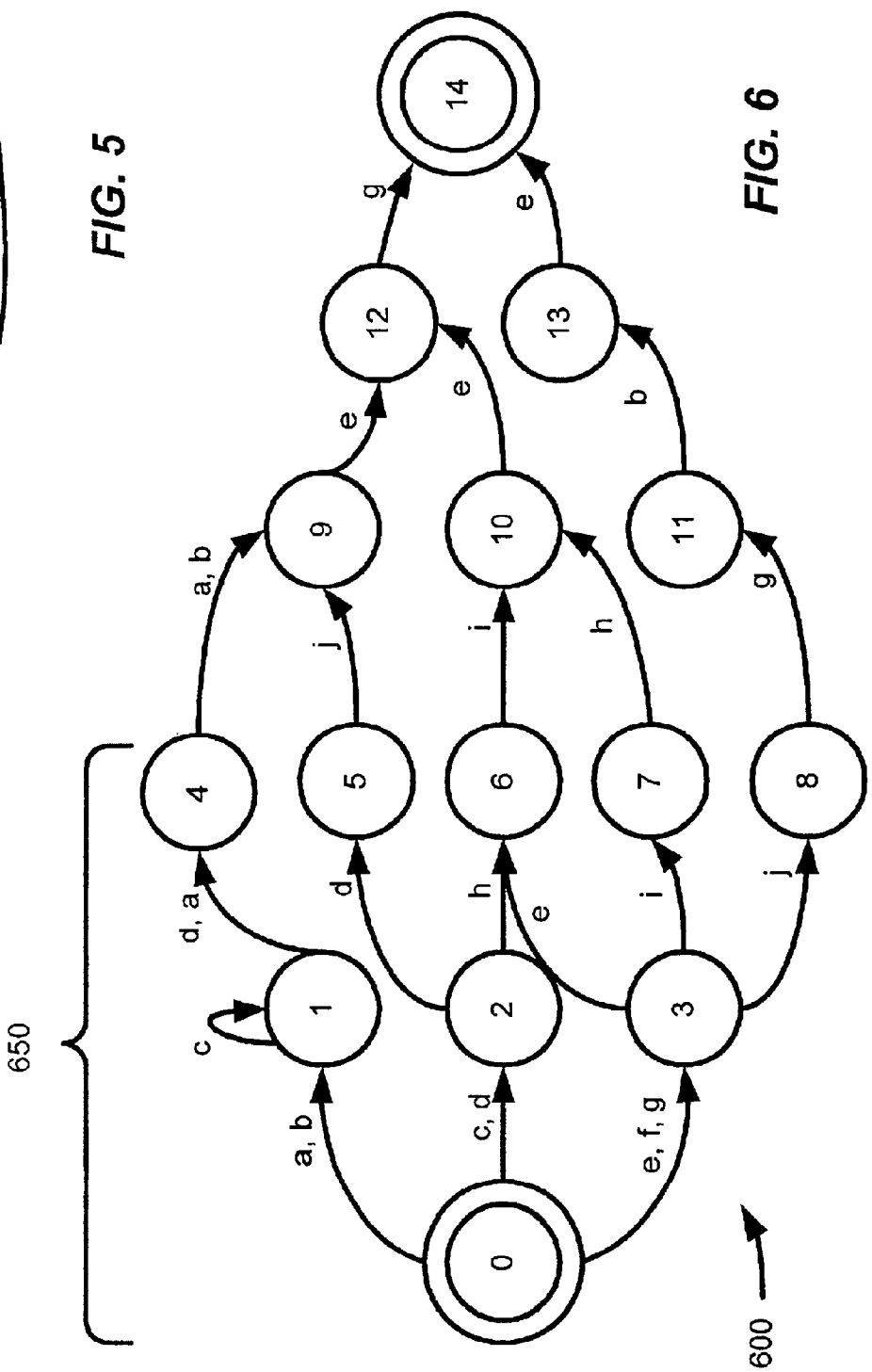
FIG. 5
FIG. 6

Fig. 6A  Illustration of number of states reachable by 2-closure.
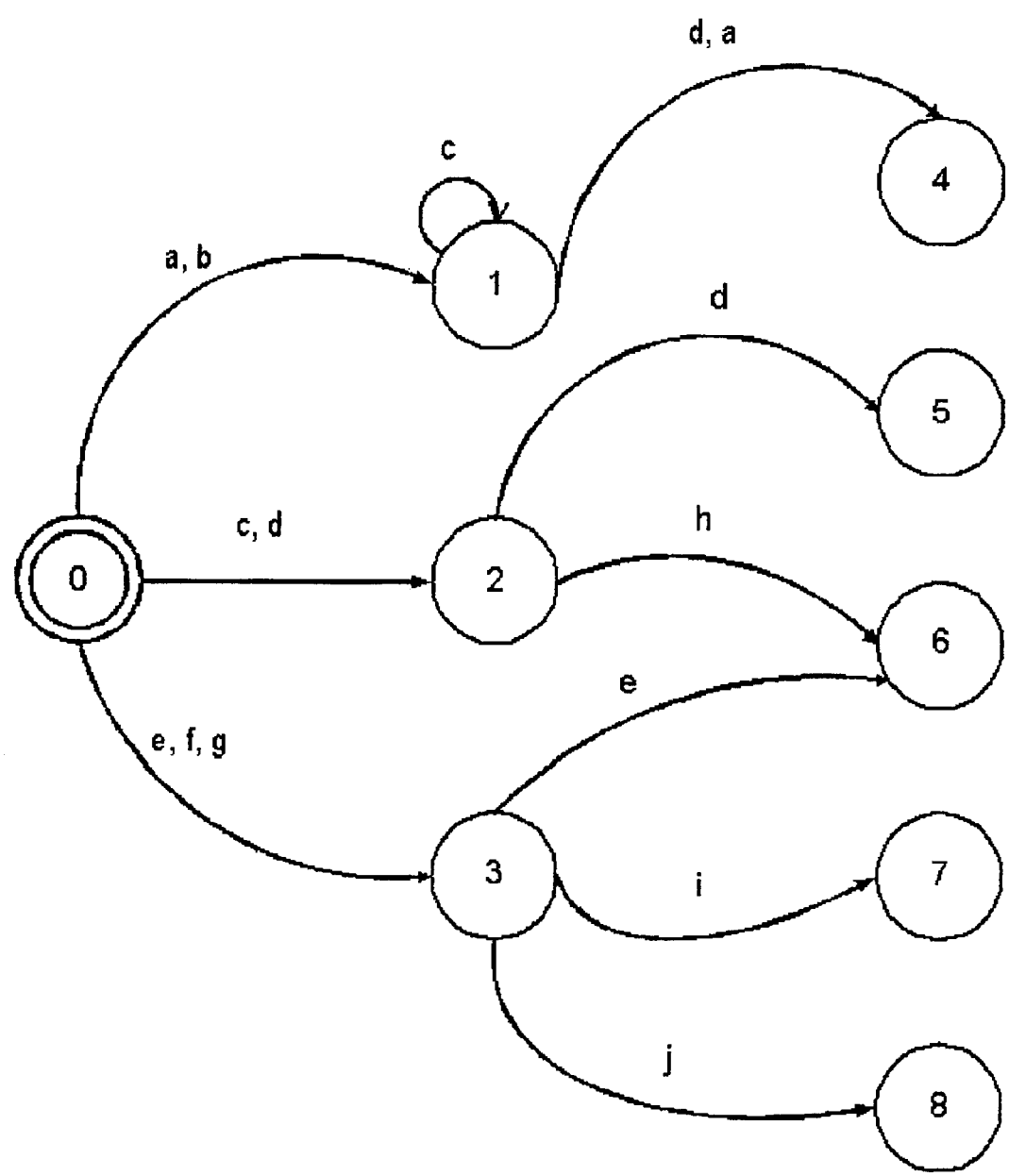

Fig. 7A    DFA for processing 8 characters
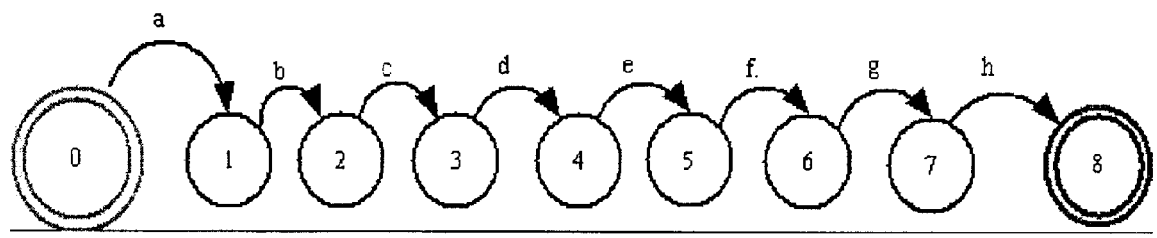
Fig 7B    RDFA for processing 4 bytes in parallel.
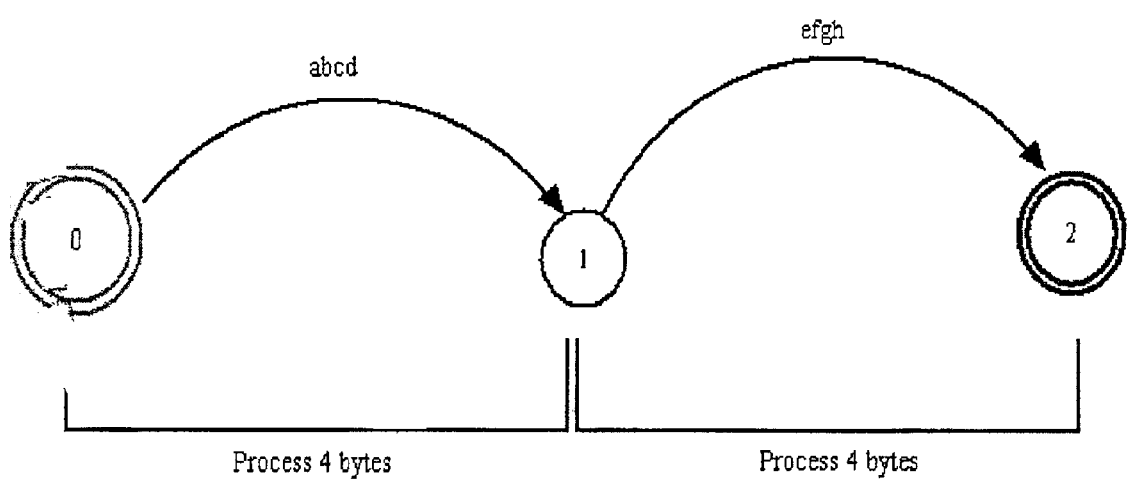

HIGH SPEED DATA STREAM PATTERN RECOGNITION

RELATED APPLICATIONS

This application is a non-provisional application of provisional application 60/322,012 filed Sep. 12, 2001. Priority of the above referenced provisional is claimed.

COMPACT DISC APPENDIX

This application includes a Compact disc appendix. The material on the compact disc is hereby incorporated herein by reference.

FIELD OF THE INVENTION

The present invention generally relates to systems and methods for performing, at high speeds, pattern recognition from streams of digital data.

BACKGROUND OF THE INVENTION

With the continued proliferation of networked and distributed computers systems, and applications that run on those systems, comes an ever increasing flow and variety of message traffic between and among computer devices. As an example, the Internet and world wide web (the "Web") provide a global open access means for exchanging message traffic. Networked and/or distributed systems are comprised of a wide variety of communication links, network and application servers, sub-networks, and internetworking elements, such as repeaters, switches, bridges, routers, gateways.

Communications between and among devices occurs in accordance with defined communication protocols understood by the communicating devices. Such protocols may be proprietary or non-proprietary. Examples of non-proprietary protocols include X.25 for packet switched data networks (PSDNs), TCP/IP for the Internet, a manufacturing automation protocol (MAP), and a technical & office protocol (TOP). Other proprietary protocols may be defined as well. For the most part, messages are comprised of packets, containing a certain number of bytes of information. The most common example is Internet Protocol (IP) packets, used among various Web and Internet enabled devices.

A primary function of many network servers and other network devices (or nodes), such as switches, gateways, routers, load balancers and so on, is to direct or process messages as a function of content within the messages' packets. In a simple, rigid form, a receiving node (e.g., a switch) knows exactly where in the message (or its packets) to find a predetermined type of contents (e.g., IP address), as a function of the protocol used. Typically, hardware such as switches and routers are only able to perform their functions based on fixed position headers, such as TCP or IP headers. Further, no deep packet examination is done. Software, not capable of operating at wire speed is sometimes used for packet payload examination. This software does not typically allow great flexibility in specification of pattern matching and operates at speeds orders of magnitude slower than wire rate. It is highly desirable to allow examination and recognition of patterns both in packet header and payload described by regular expressions. For example, such packet content may include address information or file type information, either of which may be useful in determining how to direct or process the message and/or its contents. The content may be described by a "regular expression", i.e., a sequence of characters that often conform to certain expression paradigms. As used herein, the term "regular expression" is to be interpreted broadly, as is known in the art, and is not limited to any particular language or operating system.

Regular expressions may be better understood with reference to *Mastering Regular Expressions*, J. E. F. Friedl, O'Reilly, Cambridge, 1997.

It is clear that the ability to match regular expressions would be useful for content based routing. For this, a deterministic finite state automaton (DFA) or non-deterministic finite state automaton (NFA) would be used. The approach used here follows a DFA approach. A conventional DFA requires creation of a state machine prior to its use on a data (or character) stream. Generally, the DFA processes an input character stream sequentially and makes a state transition based on the current character and current state. This is a brute-force, single byte at a time, conventional approach. By definition, a DFA transition to a next state is unique, based on current state and input character. For example, in prior art FIG. 1A, a DFA state machine 100 is shown that implements a regular expression "binky.*\.jpg". DFA state machine 100 includes states 0 through 9, wherein the occurrence of the characters 110 of the regular expression effect the iterative transition from state to state through DFA state machine 100. The start state of the DFA state machine is denoted by the double line circle having the state number "0". An 'accepting' state indicating a successful match is denoted by the double line circle having the state number "9". As an example, to transition from state 0 to state 1, the character "b" must be found in the character stream. Given "b", to transition from state 1 to state 2, the next character must be "i".

Not shown explicitly in FIG. 1A are transitions when the input character does not match the character needed to transition to the next state. For example, if the DFA gets to state 1 and the next character is an "x", then failure has occurred and transition to a failure terminal state occurs. FIG. 1B shows part 150 of FIG. 1A drawn with failure state transitions, wherein a failure state indicated by the "Fail" state. In FIG. 1B, the tilde indicates "not". For example, the symbol "~b" means the current character is "not b". Once in the failure state, all characters cause a transition which returns to the failure state, in this case.

Once in the accepting state, i.e., the character stream is "binky.*\.jpg", the receiver node takes the next predetermined action. In this example, where the character stream indicates a certain file type (e.g., ".jpg"), the next predetermined action may be to send the corresponding file to a certain server, processor or system.

While such DFAs are useful, they are limited with respect to speed. The speed of a conventional DFA is limited by the cycle time of memory used in its implementation. For example, a device capable of processing the data stream from an OC-192 source must handle 10 billion bits/second (i.e., 10 gigabits per second (Gbps)). This speed implies a byte must be processed every 0.8 nanosecond (nS), which exceeds the limit of state of the art memory. For comparison, high speed SDRAM chips implementing a conventional DFA operate with a 7.5 nS cycle time, which is ten times slower than required for OC-192. In addition, more than a single memory reference is typically needed, making these estimate optimistic. As a result, messages or packets must be queued for processing, causing unavoidable delays.

SUMMARY OF THE INVENTION

A system and method in accordance with the present invention determines in real-time whether a set of characters from a data or character stream (collectively "data stream") satisfies one or more of a set of predetermined regular expressions. A regular expression may be written in any of a variety of codes or languages known in the art, e.g., Perl, Python, Tcl, grep, awk, sed, egrep or POSIX expressions.

Additional means may be implemented to determine a next action from satisfaction of one such regular expression, or from a lack of such satisfaction of a regular expression. The present invention provides, an improved high speed, real-time DFA, called a Real-time Deterministic Finite state Automaton (hereinafter RDFA).

The RDFA provides high speed parallel pattern recognition with relatively low memory storage requirements. The RDFA includes a DFA optimized in accordance with known techniques and a set of alphabet lookup and state related tables that combine to speed up the processing of incoming data streams.

The data stream may be received by a typical computer and/or network device, such as a personal computer, personal digital assistant (PDA), workstation, telephone, cellular telephone, wireless e-mail device, pager, network enabled appliance, server, hub, router, bridge, gateway, controller, switches, server load-balancers, security devices, nodes, processors or the like. The data stream may be received over any of a variety of one or more networks, such as the Internet, intranet, extranet, local area network (LAN), wide area network (WAN), telephone network, cellular telephone network, and virtual private network (VPN).

An RDFA system in accordance with the present invention includes a RDFA compiler subsystem and a RDFA evaluator subsystem. The RDFA compiler generates a set of tables which are used by the RDFA evaluator to perform regular expression matching on an incoming data stream. The data stream may present characters in serial or parallel. For example, four characters at a time may arrive simultaneously or the four characters may be streamed into a register. The RDFA evaluator is capable of regular expression matching at high speed on these characters presented in parallel.

The RDFA compiler subsystem generates a DFA state machine from a user specified regular expression. The DFA state machine is optimized to include a minimum number of states, in accordance with known techniques. A number of bytes to be processed in parallel is defined, as M bytes. For each state in the state machine, the RDFA compiler determines those characters, represented by bytes, that cause the same transitions. Those characters that cause the same transitions are grouped into a class. Therefore, each class, for a given current state of the state machine, includes a set of characters that all cause the same transitions to the same set of next states. Each class is represented by a class code. The number of bits required for a class code is determined solely from the number of classes at a given state and byte position.

The RDFA compiler generates a set of state dependent alphabet lookup tables from the class codes and the relevant alphabet. A lookup table for a given state associates a class code to each character in the relevant alphabet. Each of M bytes under evaluation has its own lookup table. Classes are a compressed representation of the alphabet used in a state machine, since multiple symbols can be represented by a single class. This can lead to large reductions in the number of bits required to represent alphabet symbols, which in turn leads to large reductions in the size of next state lookup tables.

The RDFA compiler then generates a set of state dependent next state tables using the class codes and state machine. For each state (as a current state) in the state machine, a set of next states is determined and represented in a next state table. For a given current state, the next state is a function of the characters represented by the bytes under evaluation. The possible sets of concatenated class codes from the alphabet lookup tables serve as indices to the possible next states in the appropriate next state table. Given a current state, a table of pointers may be defined, wherein each pointer points to the appropriate next state table from the set of next state tables. The RDFA compiler can also determine the memory requirements for RDFA system data associated with a defined regular expression.

During parallel evaluation, the RDFA evaluator selects, or accepts, the next M bytes and gets the appropriate M lookup tables to be applied to the bytes under evaluation. Each byte is looked up in its corresponding lookup table to determine its class code. As previously mentioned, the class codes are concatenated. Given a current state, the RDFA evaluator retrieves the appropriate next state table. The code resulting from concatenation of the class code lookup results, is applied as an index to the selected next state table to determine the next state which involves M transitions beyond the current state.

This process continues until evaluation is terminated or the regular expression is satisfied. The process may be terminated when, for example, the bytes under evaluation do not cause a transition to a non-failure state. With a regular expression satisfied, the next action may be determined by the RDFA system, or by a system interfaced therewith. The RDFA system may be employed in any of a variety of contexts where it is essential or desirable to determine satisfaction of a regular expression, whether anchored or unanchored, in a data stream, particularly when such determinations are to be made at high speeds, such as required by OC-192 rates. The RDFA system may also be employed in contexts where consumption of relatively small amounts of memory by the RDFA system data are required or desirable.

BRIEF DESCRIPTION OF THE DRAWINGS

The foregoing and other objects of this invention, the various features thereof, as well as the invention itself, may be more fully understood from the following description, when read together with the accompanying drawings, described:

FIG. 1A is a state diagram implementing a regular expression, in accordance with the prior art;

FIG. 1B is a portion of the state diagram of the regular expression of FIG. 1A, including a failure state;

FIG. 3 is a diagram depicting 4 byte parallel processing and 4 corresponding alphabet lookup tables, used by the RDFA evaluator of FIG. 2C;

FIG. 4 is a diagram depicting a next state table, used by the RDFA evaluator of FIG. 2C;

FIG. 5 is a diagram depicting characters that cause the same state transitions, used by the RDFA compiler of FIG. 2B; and FIG. 6 is a diagram depicting a state machine used by the RDFA compiler of FIG. 2B.

FIG. 6A illustrates a number of states reachable by 2-closure.

FIG. 7A illustrates a DFA for processing 8 characters.

FIG. 7B illustrates an RDFA for processing 4 bytes in parallel

DETAILED DESCRIPTION OF THE PREFERRED EMBODIMENTS

Figure 2A:
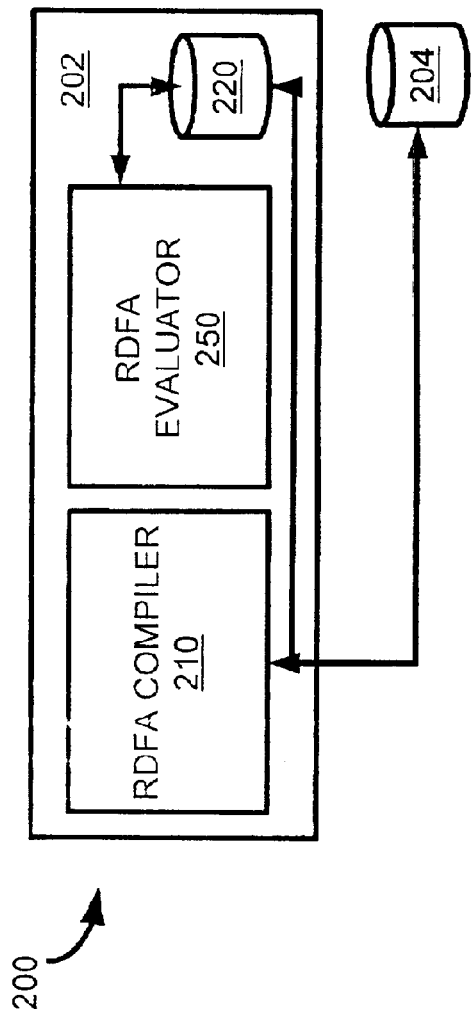
FIG. 2A is a block diagram of a RDFA system in accordance with the present invention.

In the preferred embodiment, the present invention is implemented as a RDFA system 200, shown in FIG. 2A, which includes two subsystems. The first subsystem is a RDFA compiler 210 that performs the basic computations necessary to create tables for subsequent real-time pattern recognition. The second subsystem is a RDFA evaluator 250 that performs the evaluation of characters using the RDFA tables created by the RDFA compiler 210. The RDFA system 200 includes a first memory 220 for high speed access by RDFA evaluator 250 during evaluation of characters from the data stream. This first memory 220 consists of on-chip or off-chip or any combination thereof. A second memory 204 includes the initial one or more regular expressions of interest, and need not lend itself to high speed access, unless required as a function of a particular application to which the RDFA is applied.

Figure 2B:
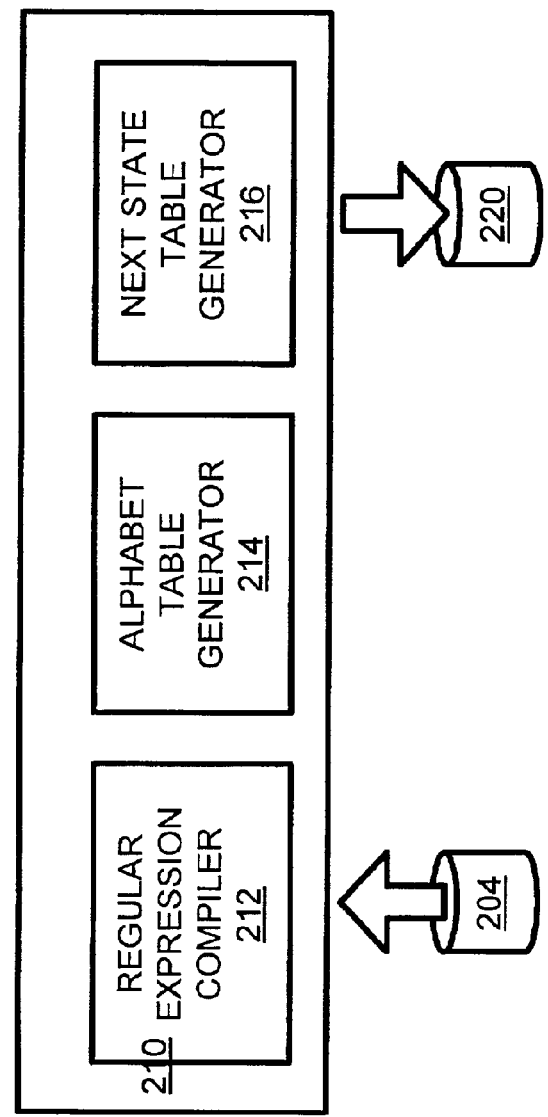
FIG. 2B is a block diagram of a RDFA compiler, from the RDFA system of FIG. 2A.

FIG. 2B is a block diagram of the RDFA compiler 210. As will be discussed in more detail below, the RDFA compiler 210 includes a regular expression compiler 212 that converts a regular expression, from memory 204, into an optimized state machine. An alphabet lookup table generator 214 generates, from the regular expression and the state machine, a series of state dependent alphabet lookup tables. The alphabet lookup tables include codes associated with each character in an applicable alphabet of characters. These alphabet lookup tables are stored in high speed memory 220. During RDFA data stream processing (i.e., character evaluation), a character represented by a byte under evaluation is looked up in a corresponding alphabet lookup table to determine its state dependent code, as will be discussed in greater detail. A next state table generator 216 generates a table of next states of the state machine to be applied during evaluation of a set of characters, wherein next states are determined as a function of a current state and the character codes from the alphabet lookup tables. The next state table is also preferably stored in high speed memory 220.

Figure 2C:
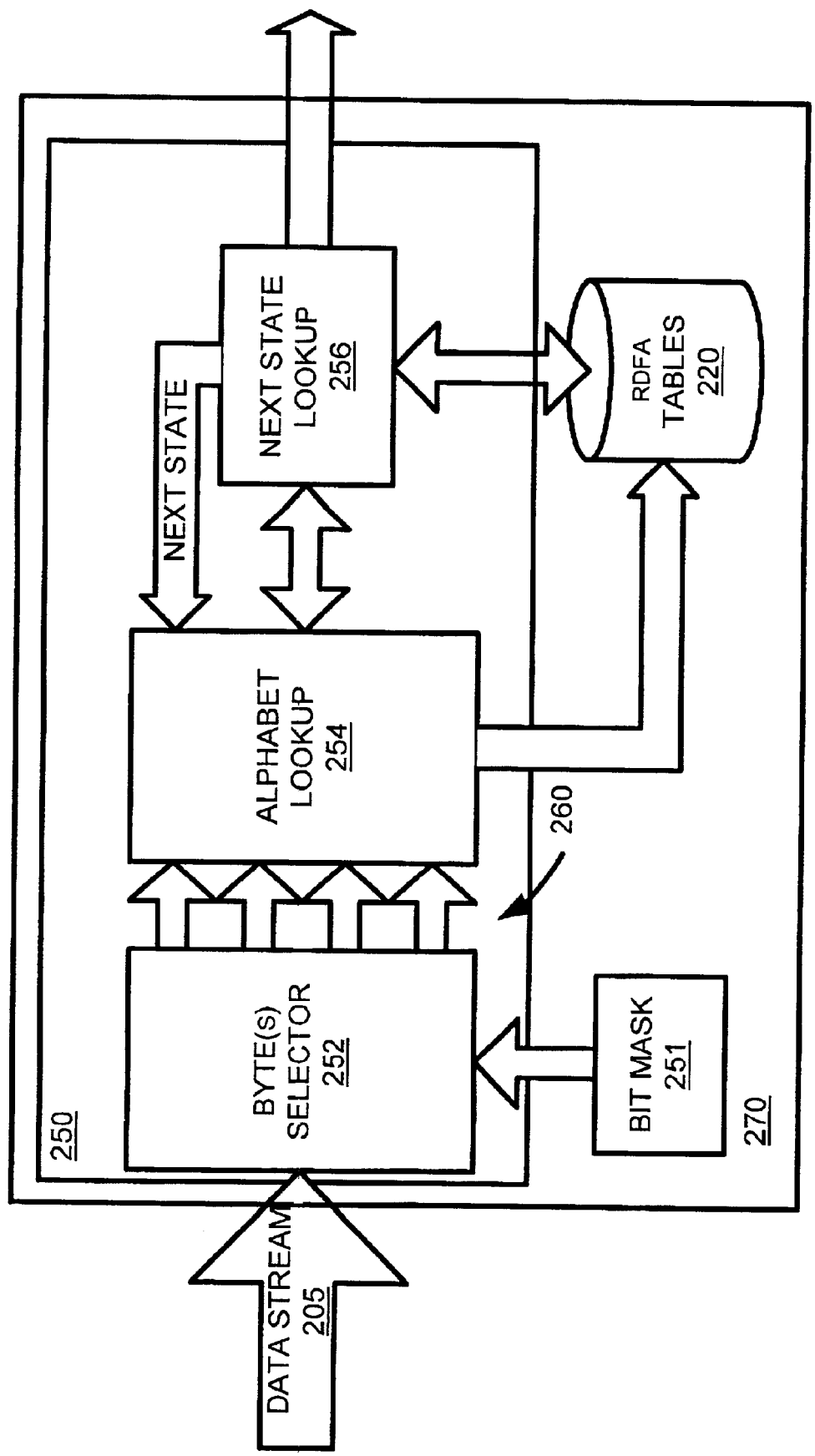
FIG. 2C is a block diagram of a RDFA evaluator, from the RDFA system of FIG. 2A.

FIG. 2C is a functional block diagram of the RDFA evaluator 250. The RDFA evaluator 250 includes several functional modules that utilize the alphabet lookup tables and, next state tables generated by the RDFA compiler 210. At a top level, a byte selector module 252 captures the requisite number of bytes (i.e., M bytes) from an incoming data stream 205. An optional bit mask 251 can filter the input stream to select words from predetermined positions, allowing the processing to ignore certain portions of the input stream. Each bit in the mask corresponds to a four byte section of a packet for this embodiment. The selected bytes are taken and processed in parallel by an alphabet lookup module 254, which selectively applies the alphabet lookup tables from memory 220 to determine a character class code for each byte. As will be discussed in greater detail, characters causing the same state transition are grouped in classes, which are represented in alphabet lookup tables as class codes of a certain bit width. The alphabet lookup module 254 concatenates the class codes obtained from the lookup tables and passes the concatenated code to a next state module 256. The next state module 256 selectively applies the concatenated class codes to the appropriate next state table from memory 220, given a current state, to determine a next Mth state in a corresponding state machine. This process continues at least until a failure state or accepting state is achieved.

The RDFA evaluator 250, as well as the RDFA compiler 210, may be implemented in hardware, software, firmware or some combination thereof. In the preferred form, the RDFA evaluator 250 is a chip-based solution, wherein RDFA compiler 210 and high speed memory 220 may be implemented on chip 270. Memory 204 may also be on-chip memory or it may be off-chip memory, since high-speed is typically not as vital when generating the RDFA. However, if high-speed is required the RDFA compiler 210 and memory 204 may each be on-chip. Therefore, preferably, to achieve higher speeds the primary functionality of RDFA evaluator 250 for processing incoming data streams is embodied in hardware. The use of pointers to next state tables, rather than directly using the alphabet table lookup results, allows flexibility in memory management. For example, if on-chip and off-chip memory is available, then pointers can be used so that more frequently used memory is on-chip, to speed up RDFA performance. The RDFA expression compiler 210 will determine the amount of memory required. This allows the user to know if a particular set of rules will fit in the on-chip memory. Thus, memory related performance can be accurately known ahead of time.

As will be appreciated by those skilled in the art and discussed in further detail below, a RDFA system 200 in accordance with the present invention requires relatively modest amounts of high speed or on-chip memory 220, certainly within the bounds of that which is readily available. Memory 220 is used to store the alphabet lookup tables and next state tables for a given regular expression. Unlike a conventional (i.e., single byte at a time processing) DFA approach, a RDFA is configured for scalable parallel processing. As a general rule, increasing the number of bytes (M) processed in parallel yields increasingly greater processing speeds, subject to the limitations of other relevant devices. While in the preferred embodiment provided herein, the RDFA evaluator 250 processes four (4) bytes in parallel (i.e., M=4), there is no inherent limitation to the number of bytes that can be processed in parallel.

Data Stream Evaluation

FIG. 3 illustrates the multiple alphabet lookup table concept 300 for a set of 4 bytes 320, which are selected from the data stream 205 by byte selector 252 and are taken as parallel input 260 by alphabet lookup module 254 (see FIG. 2C). Each byte represents a character (e.g., a number, a letter, or a symbol) from the permitted alphabet. In the preferred embodiment, a separate alphabet lookup table having 256 elements is defined for each of the 4 bytes and each state and is stored in memory 220. The alphabet lookup tables 310 are formed and applied as a function of a current state of a state machine that represents the regular expression.

In the example of FIG. 3, a first alphabet lookup table 312, having a 2 bit width, is used to lookup a first byte 322. A second alphabet lookup table 314, having a 3 bit width, is used to lookup a second byte 324, and so forth with alphabet tables 316 and 318 and third byte 326 and fourth byte 328, respectively. The elements of the alphabet lookup tables 310 are related to state transitions for a corresponding state machine that models the regular expression. Accordingly, the selection and application of alphabet lookup tables 310 is a function of the current state of the state machine. The current state is the last state resulting from the processing of the previous 4 characters, if any. Thus, a different set of alphabet lookup tables is used for each current state.

The widths of the table entries for each byte can vary from one state to the next, depending on the regular expression and the current state of the corresponding state machine. In the FIG. 3 example, the table widths in bits are 2 bits for table 312, 3 bits for table 314, 3 bits for table 316, and 4 bits for table 318. The table widths in another state might be 1 bit, 1 bit, 2 bits, and 4 bits, as an example. For instance, if for the first byte there are only two possible character classes, then the width of the alphabet lookup table for that bit need only be 1 bit. The current state is stored in memory (e.g., on-chip memory 220) for use in determining which alphabet lookup tables to apply to the 4 bytes 320 and for determining a next state.

For each of the 4 bytes 320, using lookup tables 310 a different class code is obtained by alphabet lookup module 254. As previously discussed, the characters are grouped into classes according to the state transitions the characters cause and codes associated with those classes (i.e., class codes) are represented in the alphabet lookup tables. Therefore, if byte 322 represents the character "a", alphabet lookup module 254 finds the element in alphabet lookup table 312 that corresponds to "a" and obtains the class code stored at that element (e.g., class code 01). This is done for each other byte (i.e., bytes 324, 326 and 328) using their respective alphabet lookup tables (i.e., tables 314, 316 and 318).

The lookup table class codes for each of the 4 bytes are concatenated together, which for the FIG. 3 example produces a 12 bit result (i.e., 2+3+3+4 bits). As an example, assume that from lookup tables 310 of FIG. 3 resulted a 2 bit word "01" from table 312, a 3 bit word "001" from table 314, a 3 bit word "011" from table 316, and a 4 bit word "0000" from table 318. The resulting 12 bit concatenated word would be "01001010110000".

As is shown in FIG. 4, the current state of the state machine is used as an index into a table of pointers 410. Table 410 is defined as a function of the regular expression's state machine, so each current state has a corresponding table to possible next states. Each pointer in table 410 points to a linear (i.e., 1 dimensional (1-D)) table 420 of next state values (or a "next state table") and the 12 bit concatenated result of the parallel alphabet lookup is used as an offset or index into the selected next table 420. Therefore, a next state value is selected from next state table 420 as a function of the current state and the concatenated 12 bit word. The selected next state value corresponds to the next state. The next state determined from evaluation of the 4 bytes serves as the current state for evaluation of the next set of 4 bytes.

In the preferred form, the selected next state table value includes a terminal state code (e.g., with higher order bit set to 1) that indicates whether or not the next state is an accepting state (or terminal state). Generally, a terminal state is a state the process enters when processing from a data stream with respect to a certain one or more regular expressions is completed; i.e., it is indicative of termination of processing with respect to the one or more regular expressions. For example, in the preferred embodiment a high order bit associated with one or more of the bytes under evaluation is set to "1" upon transition into a terminal state. In one embodiment, the hardware stores the word (i.e., the 4 bytes under evaluation) for which the terminal state occurred and the corresponding offset from the lookup table (i.e., the 12 bit concatenated word). Thereafter, post processing software may use the stored data to determine at which of the 4 bytes the regular expression terminated. This is useful in many situations where only a small number of regular expression matches occur per packet, so the number of such determinations is relatively small. In another embodiment, the codes (i.e., the 4 bytes and 12 bit word) are stored in a secondary terminal state table, which allows the hardware to directly determine which byte terminated the processing. The benefit of allowing the hardware to make such determinations is that it can be accomplished much more quickly in hardware, which is a significant consideration in high speed, real-time processing.

In accordance with the preferred embodiment, only three (3) memory operations are required to process the 4 bytes. They are: (i) find characters in lookup tables 310; (ii) find pointer in table 410; and (iii) get next state indicia from next state table 420. Further, these operations may be easily pipelined by performing the character table lookup at the same time as the last 4 byte result is being looked up in the next state table, to allow improved processing times, with the only significant limitation being the longest memory access.

The benefits of the preferred embodiment can be further appreciated when the RDFA memory requirements are compared with those of a naïve DFA approach, where the lookup is applied to a 4 byte word. In this type of DFA parallelization, 4 bytes would be looked up in parallel. This would require a table having $256^4$ entries, which is about 4.295 billion entries, and a word (4 byte) cycle time of 3.2 nS in order to keep up with OC-192 rates (i.e., 10 Gb/sec). This is impractical to implement with current or near-term memory technology, based on the speed and size required to keep up with OC-192 rates. Further, such a large amount of memory cannot be implemented on-chip, so a significant amount of off-chip memory would be required, unacceptably slowing the process. Compare the memory requirement of simple DFA parallelization with the greatly reduced amount of memory used in the preferred embodiment of the RDFA system 200. Note that the naïve DFA parallelization requires many orders of magnitude greater memory size than an RDFA system 200, in accordance with the present invention.

Figure 4A:
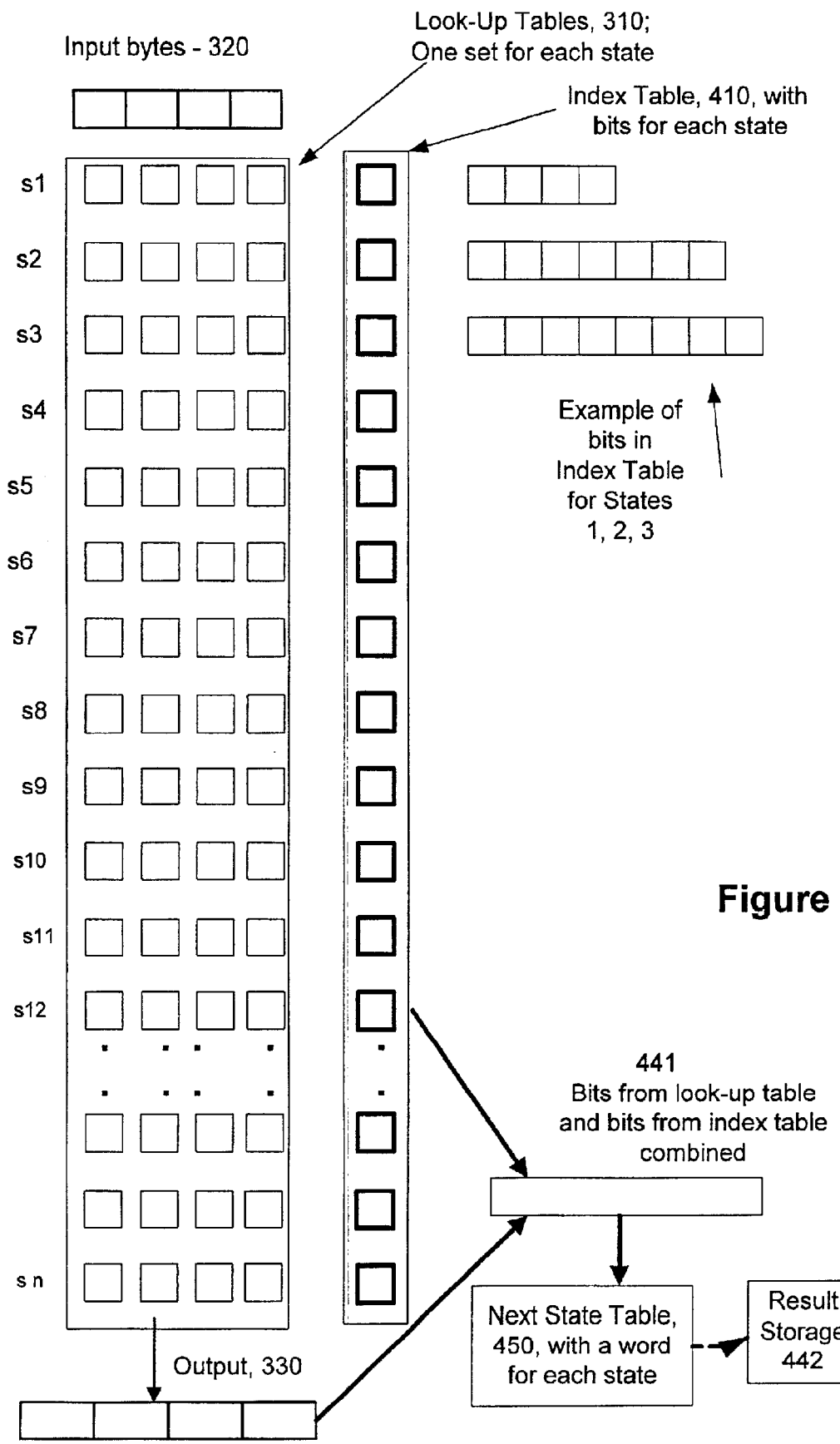
FIG. 4A is a diagram indicating the flow of data from the character tables, the index table and memory.

FIG. 4A is another illustration of the alphabet lookup tables 310, the index table 410, and the next state table 450 showing their operation and interactions. The bytes which are being examined are designated 320. Bytes 320 are a four byte segment from a data stream (i.e. four bytes from a data packet that is being examined). The alphabet lookup tables 310 have a segment associated with each possible state of the state machine. In FIG. 4A the states are designated s1, s2, s3, etc. along the left side of the figure. In each state, the bytes 320 are used to interrogate the section of table 310 associated with that particular state. The lookup operation produces a multi-bit result 330. The number of bits in the result 330 (i.e. the number of bits retrieved or generated by the alphabet lookup table) is a function of the particular bytes 320, the particular state, and the byte position. The index table 410 has an entry for each state. Each entry in table 410 includes a code which tells the system how many bits to retrieve from the output of the lookup table 310 for that particular state. (Note in an alternate embodiment this code is stored in a separate table that has a location for each state similar to table 410) During any particular state conventional addressing circuits address and read the contents of the location in table 410 associated with the particular state. The result bits 330 and the bits in the current state position of the index table 410 are concatenated to produce a memory address 441. As indicated at the left side of FIG. 4A, different locations in index table 410 have a different number of bits. The number of bits in concatenated result 441 (i.e. total number of bits from table 410 and result 330) is always a fixed number. In the preferred embodiment that number is 13. The number of bits equals the number of bits in a memory address for the particular system. Thus, for each state the associated location in table 410 indicates how many bits should be retrieved from table 310 and it provides a series of bits so that there is a total of 13 bits for address 441.

Address 441 is the address of an entry in the next state table 450. The memory address 441 is used to interrogate next state table 450 utilizing conventional memory addressing circuitry. The entry in next state table 450 at address 441 indicates the next state. The entry in the next state table 450 may also contain a flag which indicates that the operation has reached a special point such as a termination point.

The operations proceed until the flag in the next state table indicates that the operation has reached a termination point or that the bytes have been recognized or matched. When a match is found, processing the bytes in a particular packet can then either terminate or the system can be programmed to continue processing other sets of bytes 320 in an attempt to find other matching patterns.

If the next state table does not indicate that the operation has terminated, the process proceeds to the next state and the process repeats. If the process repeats the information in appropriate next state table 450 is used. That is, the designation of the next state in table 450 is used to generate the address of an appropriate section of lookup table 310 and the process repeats. Upon reaching a termination state, the following data is saved in memory registers 442:

1. Pointer to the word (4 bytes) in the packet at which the terminal state occurred.
2. The table offset (computed from the alphabet table lookups results and index table) into the next-state table.

The saved data can be used by post processing operations which determine what action to take after the operation has terminated. In some embodiments when a termination flag is encountered which indicates that a match is found, the operation continues, that is, additional bytes in the string is are processed in an effort to locate another match to the specified regular expression.

In general after four bytes have been processed, four different bytes are streamed into register 320 and the process repeats. Furthermore, one can search for a wide array of different patterns. A target pattern can be more than four bytes long. For example if one is searching for a five byte pattern, after four of the bytes have been located another set of four bytes can be streamed into register 320 to see if the fifth byte is at an appropriate location.

An appendix on a CD is provided containing a specific example of the data that would be stored in table 310, 410 and 450 so that the system would proceed through a series of states to locate the character string "raqia". It is noted that each different set of regular expressions which one wants to locate require a different set of data in tables 310, 410 and 450. The example given is an example that contains 5 particular characters in sequence. It should however be understood that the invention can be used to locate any desired regular expression, not just fixed character sequences. The specific data for tables 310, 410 and 450 given in the appendix are for locating or recognizing the particular character sequence "raqia". The data files in the appendix are designated as follows: (a) the data for the four byte positions for table 310 are designated: __hwct__0.txt, __hwct__1.txt, __hwct__2.txt, __hwct__3.txt. (b)The data for index table 410 is designated __it.txt. (c) The data for the next state table 450 is designated __nst.txt.

In the specific example provided in the appendix, the tables provide for 32 states of operation. The four tables 310 each have 32 sections each with 256 entries for a total of 8192 entries. The index table has 32 entries. It is noted that the choice of 32 states is matter of engineering choice for the particular application. In the particular example given in the appendix, the next state table 450 has 8192 entries. It is noted that the number of entries in this table is also a matter of choice. The number of entries in the next state table for each state is determined by the number of combinations of character classes for that state for all the byte positions. For example, if the number of character classes for byte positions 0 through 3 are 4, 4, 8, 8 respectively, then the total number of next state table entries for that state is 4×4×8×8=1024. And the total size of the address space for all the states is the sum of the table sizes for each state. In one embodiment the number of character classes at each byte position is a power of 2, but other embodiments use various different numbers of character classes.

It should be noted that while in the embodiment described, four bytes are processed in parallel, alternate embodiments can be designed to handle different numbers of bits in parallel. For example other embodiments can handle 1, 2, 6, 8, 12 bytes in parallel.

Creation of the RDFA Tables

To generate a RDFA in accordance with the present invention, the regular expression compiler 212 converts a regular expression from memory 204 into a DFA. The regular expression compiler 212 may also optimize the DFA to minimize the number of states. These processes are known in the art, so are not discussed in detail herein. The regular expression compiler is also configured to determine the amount of memory required to store the RDFA for a given regular expression, as will be discussed in further detail below. This allows the user to know if a particular set of rules (i.e., regular expressions) will fit in the on-chip memory. Thus, performance can be accurately predicted.

The regular expression compiler 212 also reduces state transition redundancy in the alphabet representing the input data stream by recognizing that DFA state to state transition decisions can be simplified by grouping characters of an alphabet according to the transitions they cause. The list of states that may be reached in a single transition is referred to as '1-closure'. The term "n-closure" is defined as the list of states reachable in n transitions from the current state. n-closure is readily calculated recursively as the list of states reachable from the n−1 closure. There may be more than one character that causes the same transitions to the same n-closure set. In such a case, characters may be grouped into classes according to the set of next state transitions they cause. Rather than representing individual characters, each class may be represented in a 1, 2, 3, or 4 bit code, for example. In this manner, the applicable alphabet is represented in an extremely economical form.

Even very complicated expressions can achieve significant compression in the number of bits required to represent its alphabet by mapping to character classes. For example, a portion of a regular expression represented as "(a|b|c|g)" can be represented in a state transition diagram 500, shown in FIG. 5, wherein the expression indicates "a" or "b" or "c" or "g". These characters all cause a transition from state "1" to state "2", therefore, these characters can all be mapped into a single class. If all other characters cause a transition to a failure state, then all of those characters can be grouped into a second class. Therefore, when in state 1 of FIG. 5 (i.e., state 1 is the current state) all transitions can be represented with a 1 bit code, wherein a code of "1" could indicate a transition into state "2" and a code of "0" could indicate a transition into a failure state F (not shown). Mapping characters into classes eliminates the need to represent characters with 8 bits, as is typical with conventional approaches.

Alphabet lookup tables are generated by the alphabet table generator 214 of FIG. 2B. In the present invention, the RDFA alphabet lookup tables reflect the classes that represent the state transitions, wherein the 1, 2, 3, or 4 bit representation, as the case may be, are embodied in character classes related to the current state. In general, when M bytes are processed in parallel a separate alphabet lookup table is computed for each of the M bytes. Further, a different set of tables is computed for each state in the state machine. Thus, if a state machine has L states and M bytes are processed in parallel, a total of (L×M) alphabet lookup tables are produced, in accordance with the preferred embodiment.

The algorithm used to produce the M character class tables for a regular expression state machine from a starting state S, is as follows. The nth alphabet lookup table (where $1 \leq n \leq M$) uses the previously computed n−1 closure and then computes the n-closure. Then, for each character in the alphabet, a list of non-failure state transitions from the n−1 closure to the n-closure is generated. An alphabet mapping is then initialized by placing the first character in the alphabet into character class 0. The transition list for the next letter in the alphabet, for a given regular expression, is examined and compared with the transitions for the character class 0. If they are identical, then the character is mapped to class 0, otherwise a new class called "class 1" is created and the character is mapped to it. This process proceeds for each character in the alphabet. So, if a list of transitions for a character matches the transitions for an existing class, then that character is represented in that existing class, otherwise that character is the first member of a new class. The result of this process is a character class number associated with each character in the alphabet. The total number of classes for a particular lookup table may be represented by P. Then, the number of bits necessary to represent each symbol is given by:

$$Q = \text{floor}(\log_2 P) + 1$$

Q is also the width of the table entries in the alphabet lookup table (e.g., 1, 2, 3, or 4 bits). For example, in alphabet lookup table 312 of FIG. 3, Q=2. Note that Q is computed for each alphabet lookup table separately and varies as a function of both state and byte position.

This concept may be appreciated with a simple example for processing 2 bytes in parallel (i.e., for M=2) for the portion 650 of a state machine 600 shown in FIG. 6. This example focuses primarily on lookup tables and transitions from the 0 state. State machine 600 is derived from a predefined regular expression. The 1-closure for state 0 is (1, 2, 3, F), where the failure (or terminal) state may be denoted by symbol F (not shown). That is, as can be seen from FIG. 6, from state 0, non-failure transitions may be to state 1, state 2, or state 3. Table 1 provides a list of state transitions out of state 0 for an alphabet consisting of letters from "a" to "k", in accordance with the state diagram 600 of FIG. 6.

TABLE 1

Transitions for State Diagram 600, From State 0

| Letter | Transitions |
|---|---|
| a | 0 ⇒ 1 |
| b | 0 ⇒ 1 |
| c | 0 ⇒ 2 |
| d | 0 ⇒ 2 |
| e | 0 ⇒ 3 |
| f | 0 ⇒ 3 |
| g | 0 ⇒ 3 |
| h | Ø null (or F state) |
| i | Ø null (or F state) |
| j | Ø null (or F state) |
| k | Ø null (or F state) |

Upon inspection, Table 1 shows that the alphabet maps to 4 different equivalent classes, meaning that 2 bits are sufficient for the width of an alphabet lookup table for a current state of state 0. Therefore, with regard to a current state 0, the following classes may be formed: class 0 (a, b), class 1 (c, d), class 2 (e, f, g,) and a failure state class 3 (h, i, j, k). In the corresponding alphabet lookup table, class 0 may be represented as "00", class 1 as "01", class 2 as "10", and class 3 as "11", as follows:

TABLE 2

Lookup Table Entries, Current State 0

| Letter | Class Code In Alphabet Lookup Table |
|---|---|
| a | 00 |
| b | 00 |
| c | 01 |
| d | 01 |
| e | 10 |
| f | 10 |
| g | 10 |
| h | 11 |
| i | 11 |

TABLE 2-continued

Lookup Table Entries, Current State 0

| Letter | Class Code In Alphabet Lookup Table |
|---|---|
| j | 11 |
| k | 11 |

The 2-closure for state machine 600 is (1, 4, 5, 6, 7, 8, F) from state 0. Similarly, Table 3 is a list of state transitions for each character for the 2-closure. In this case, inspection of Table 3 shows the alphabet maps to 8 equivalent characters, so that 3 bits are required for the table width. Note that as indicated in the Q value calculation, if the number of equivalent characters had been 5, the table width would still be 3 bits.

TABLE 3

Transitions for State Diagram 600, From State 1

| Letter | Transitions |
|---|---|
| a | 1 ⇒ 4 |
| b | Ø null (or F state) |
| c | 1 ⇒ 1 |
| d | 1 ⇒ 4 |
|  | 2 ⇒ 5 |
| e | 3 ⇒ 6 |
| f | Ø null (or F state) |
| g | Ø null (or F state) |
| h | 2 ⇒ 6 |
| i | 3 ⇒ 7 |
| j | 3 ⇒ 8 |
| k | Ø null (or F state) |

The next state table generator 216 of FIG. 2B generates, for each state in the state machine (as a current state), a list of next states represented in next state tables (e.g., next state table 420 of FIG. 4). Therefore, for each current state, there is a one-dimensional (1-D) list of possible next states. Using state machine 600 of FIG. 6, assume the current state is state 0 and M=4 (where M is the number of bytes processed in parallel). As was discussed with respect to states 0 through 3 above, and shown in Tables 1–3, the characters that cause state transitions can be mapped into classes. The corresponding next state table is comprised of entries that dictate the next state given the class codes of the four characters (or bytes) under evaluation from the alphabet lookup tables.

Assume 4 bytes were received representing the 4 characters "c, h, i, e". As mentioned previously, the class code for "c" with a current state 0 is 01. The class code for "h" is 3 bits, as the second of 4 bytes assume its class code is 011. Also, assume for a current state 0 and as the third of 4 bytes, the class code for "i" is 0011. Finally, assume for a current state of 0 and as the fourth byte, the class code for "e" is 101. The corresponding next state table, will have a next state value corresponding to state 12, given the above class codes for the 4 bytes and a current state 0. In the preferred form, the class codes are concatenated (e.g., 010110011101) to form an index into the next state table, thus yielding the proper next state. In this manner, the next state table and the corresponding table of pointers, which are addressed by state, is generated for a regular expression. That is, next state table generator 216 works through the state machine and alphabet lookup tables to generate the next state and pointer tables.

The following is an explanation of the invention from a somewhat different perspective: The purpose of the invention is high speed recognition of patterns in a data stream.

The patterns are described by 'regular expressions', which means they may be quite general. For example, the regular expression to detect filenames prefixed by 'binky' or 'winky', containing 'xyz' and having a filename extension '.jpg' are found by the regular expression:

(binky|winky).*xyz.*\.jpg

The RDFA (i.e. the present invention) can search for patterns at fixed locations (anchored), as needed for IP packet filtering, but it can also locate unanchored regular expressions anywhere in a packet payload.

The RDFA has other very important features and advantages over a conventional DFA. It allows parallel processing of bytes. This is important in high speed applications such as OC-192 transport layers, where four bytes-arrive from the framer at time. A conventional DFA can not be easily implemented at OC-192 rates with todays memory speed cycle time and logic delay time limitations.

Another advantage is that the RDFA has memory requirements that can be precomputed for a particular set of patterns to be recognized. Finally, the design allows convenient separation of the algorithm between on and off-chip memory when expression complexity becomes large.

A conventional DFA requires creation of a state machine prior to its use on a data stream and the RDFA has a similar requirement. The user makes a list of regular expressions (rules) and actions to be carried out if a rule is satisfied. A special purpose RDFA compiler converts the rules and actions into a set of tables which are downloaded to the RDFA hardware. The operation of the RDFA is described below, followed by a description of the algorithm implemented in hardware. Finally, the process and algorithms used to created the RDFA tables are described.

The RDFA operates in a manner similar to a (DFA) but with new features that allow parallelization of the processing, while making enormous reduction in the memory requirements compared with naive parallelization. The speed of a conventional DFA is often limited by the cycle time of memory used in its implementation. For example, processing the data stream from an OC-192 source must handle 10 billion bits/second (10 Gbs). This speed implies a byte must be processed every 0.8 nS, which is beyond the limit of state of the art memory and logic circuits. For comparison, conventional high speed SDRAM chips operate with a 7.5 nS cycle time, which is ten times slower than required. A feature of the RDFA is the ability to process the data stream bytes in parallel. As described below the RDFA processes 4 bytes in parallel, but the algorithm may be applied to arbitrary numbers of bytes, meaning that it is scalable to higher speed. This allows the use of memory that is readily available and far lower in cost than required by a brute-force, single byte at a time, conventional approach.

In the specific embodiment presented, a separate 256 element lookup table is used for each of the 4 bytes processed in parallel, with table entries having 1 to 4 bits width per entry. FIG. 3 illustrates the multiple alphabet lookup table concept. In this particular example, the first byte looked up produces a two bit result. The second byte produces a three bit result and so forth. It is very important to note that the set of alphabet lookup tables used are state-dependent. Thus, a different set of four tables is used for each state. Further, the widths of the table entries for each byte position can vary from one state to the next. Thus, the width of each alphabet table lookup is stored as a function of state, so that it can be looked up by state, in order to concatenate the correct number of bits from each lookup. In the FIG. 3 example the table widths in bits are denoted (2, 3, 3, 4). The table widths in another state might be (1, 1, 2, 4).

The lookup results for each byte are concatenated together, which for the FIG. 3 example produces a 12 bit result. Next, as shown in FIG. 4, the current state is used as an index into a table of pointers and a single pointer is selected on the basis of current state. Each pointer, points at a separate linear (1-D) table of next state values and the concatenated result of the parallel alphabet lookup is used as an offset into the selected table. The selected table entry is the value of the next state and also has a code indicating when a terminal state has been reached. The high order bit for each next-state table entry is called the 'special flag' and is set to one to indicate an acceptor state has been reached somewhere in the 4 bytes being processed. In the preferred embodiment, when a lookup in the next-state table results in the special flag being set, the hardware will store two pieces of information into the next entry of a DFA results table. The data saved are:

1. Pointer to the word (4 bytes) in the packet at which the terminal state occurred.
2. The table offset (computed from the alphabet table lookups results and index table) into the next-state table.

Post processing software can use the saved data to determine at which of the 4 bytes the regular expression terminated. This is acceptable in situations of interest, only a small number of regular expression matches occur per packet. Alternate embodiments store codes into a secondary terminal state table which will let the hardware directly determine which of the 4 bytes in a word, terminated the matched pattern.

Regardless of how the special flag is set, the value of the next-state table entry is used to set the next state of the RDFA machine. Thus, when processing the full packet has finished, the entries in the result-table contain information that can be used to determine all regular expression matches in the packet.

The use of pointers to next state tables, rather than directly using the alphabet table lookup results, allows flexibility in memory management. For example, in embodiments that have on-chip and off-chip memory, pointers can be used so that more frequently used memory is on-chip, to speed up RDFA performance. The expression compiler can determine the amount of memory required. This allows the user to know if a particular set of rules will fit in the on-chip memory. Thus, memory related performance can be accurately known ahead of time.

The preferred embodiment requires memory lookup operations to process the 4 bytes. Specifically, the memory lookups are:

1. Parallel lookup of each incoming byte from the data stream.
2. Lookup of the number of bits width for each alphabet lookup result based on state
3. Lookup of pointer for next-state table based on current state
4. Lookup of next state.

These memory operations may be pipelined to allow effective processing times limited by the longest memory access. Another advantage of the approach is seen when its memory requirements are compared with a simple DFA approach applied to processing 4 bytes in parallel. A simple approach to DFA parallelization, does a lookup on the 4 bytes in parallel This will match the speed of the RDFA, but requires a table of size $2^{32}$ entries, which has 4.295 billion entries and a cycle time of 3.2 nS in order to keep up with OC-192 rates (10 Gb/sec). Such a system is difficult to implement with current or near-term memory technology, based on the speed and size required. Further, such a large memory is difficult to implement on-chip with the RDFA processing algorithm.

RDFA Algorithms and Programming (That is, Creation of the RDFA Tables): The front end to the RDFA converts a regular expression to a Nondeterministic Finite Automata (NFA). The NFA is then converted to a Deterministic Finite Automata (DFA). Finally, an optimization is done on the DFA to minimize the number of states. Such processes are well known to compiler writers and are described in the literature. The process described herein converts the state-optimized DFA to an RDFA.

The RDFA reduces the redundancy in the alphabet representing the input stream by recognizing that at a given state in the DFA the transition decision can be made by grouping letters of the alphabet according to the transition they cause. For example, in the FIG. 1 the only symbol which will cause a transition to state 3 is the letter 'n'. From state 2, all other characters transition to the failure state. Thus, for this case, a single bit is sufficient to represent the alphabet because the characters can be mapped to two classes, 'n' and everything else. More complicated transitions can still in general achieve large compression in the number of bits required to represent the alphabet through mapping to character classes. For example, a portion of a regular expression represented as: (a|b|c|g) would be represented in a state transition diagram as shown in FIG. 5. The use of mapping characters to classes changes the 8 bits conventionally used to represent the input character to just a few bits. The basic idea behind mapping characters to classes is recognition that as far as transitions in the state machine are concerned many different characters have identical results. Thus, these many different character codes, which have identical results as far as state transition can be mapped to the same character code, referred to as a 'class'. The alphabet lookup tables perform this mapping function at wire speed. Offline work is required to initially determine them.

Algorithm for Production of Alphabet Lookup Tables: The list of states that may be reached in a single transition is referred to as '1-closure'. We define the term 'n-closure' as the list of states reachable in n transitions from the current state. n-closure is readily calculated recursively as the list of states reachable from n−1 closure. In general when M bytes are processed in parallel, a separate alphabet lookup table must be computed for each of the M bytes. Further a different set of tables is computed for each DFA state. Thus if a DFA has L states and M bytes are processed in parallel, a total of (L×M) alphabet lookup tables must be produced. The algorithm used to produce the M character class tables used to parallel process M bytes, for starting state S, is as follows. The $n^{th}$ lookup table ($1 \leq n \leq M$) production first computes the n−1 closure. For each symbol in the alphabet, a list of state transitions from the n−1 closure to the next state is made. Now the alphabet mapping is initialized by placing the first symbol in the alphabet into character class 0. The transition list for the next letter in the alphabet is examined and compared with the transitions for the character class 0. If they are identical, then this character is mapped to class 0, otherwise a new class called 'class 1' is created and the character is mapped to it. This process proceeds for each character in the character set. If the list of transitions for the character matches an existing class, then it is placed into that class, otherwise it is the first member of a new class. The result of this process is a character class number associated with each symbol in the alphabet. This mapping means that all characters in a given class have an identical list of transitions from the n−1 closure to the next state and thus as far as the state machine behavior is concerned are identical symbols.

If the total number of classes for a particular lookup table is P. Then, the number of bits, Q, necessary to represent each symbol is floor($\log_2 P$)+1. Q is the width of the table entries in the lookup table. Note that Q is computed for each lookup table separately and varies as a function of both state and byte position. Since the above discussion is abstract, the concept is illustrated below with a simple example for processing 2 bytes in parallel for the portion of a DFA shown in FIG. 6A. The illustration will be done only for the lookup tables from the 0 state. The 1-closure for this example is, (1, 2, 3, F) where the failure state is denoted by symbol F. The 2-closure is (1, 4, 5, 6, 7, 8, F) in this illustration. Table 1, which is given in an earlier section of this document is a list of non-failure transitions out of state 0 for an alphabet consisting of letters from a to k. Upon inspection, Table 1 shows that the alphabet maps to 4 different equivalent characters, meaning that 2 bits are sufficient for the table width. Similarly, Table 2 (also given in an earlier section of this document) is list of non-failure state transitions for each symbol for 2-closure. In this case the alphabet maps to 8 equivalent characters, so that 3 bits are required for the table width. Note that as indicated in the Q value calculation, if the number of equivalent characters had been 5, the table width, would still be 3 bits.

An important Feature of RDFA: An important property of the RDFA is that the bytes in the data stream are treated as letters in an alphabet and are mapped to character classes. In general, many characters map to a single class, greatly reducing the number of bits necessary to represent an alphabet symbol. As a consequence, when multiple characters are concatenated together and used for a next-state table lookup, the size of the next-state table is greatly reduced, when compared with concatenation of multiple bytes.

Important Hardware Implementation Feature: The RDFA has many applications, some involving searching full packets for unanchored expressions. The system (i.e. the engine) described above, is well suited to this application. Another application is searching fixed headers for patterns. A special feature incorporated into the RDFA is a programmable datastream bit mask, where each bit corresponds to a sequential word in the input data stream of a packet. For example, an ethernet packet containing 1500 bytes contains 375 words, and a 375 bit mask allows complete freedom in selection of words to be processed. When a bit is set on in the data stream mask, the corresponding word is fed to the RDFA. If the bit is turned off then the corresponding word is not seen by the RDFA. This allows a front end filter that operates at line rate which greatly reduces the load on the RDFA when processing fixed position header information. Further, this can lead to reductions in the complexity and memory used by the RDFA. With the above described mask only a small subset of the datastream must be processed and the data that is processed can be handled in a simpler manner, which in turn means larger rule sets can be used for a given amount of memory.

Reduction of Table Sizes: The RDFA requires a set of alphabet lookup tables and a next state table for each state. If the number of states can be reduced, then the size of the lookup tables can be reduced. In a classic DFA, when M characters are processed the state machine transitions through M states. For an RDFA it is recognized that processing M bytes in parallel can be treated as a black box, transitioning between two states. For example, as shown in FIG. 7A, the character string 'abcdefgh' is intended to be matched. Not counting initial state, a classic DFA has 8 internal states through which it transitions including the acceptor state. However, if 4 bytes are processed in parallel, then only 2 states are needed to represent the transitions as shown in FIG. 7B. Note that this is a special case since cyclic graphs, representing wild-cards or arbitrary numbers of character repetitions, may not occur in this type of processing.

The invention may be embodied in other specific forms without departing from the spirit or central characteristics thereof. While not discussed in detail, incoming data may be evaluated against a plurality of regular expressions simultaneously. In such a case, entering a failure state for one regular expression state machine only terminates processing with respect to that regular expression. The present invention may also be implemented in any of a variety of systems, e.g., to detect a computer virus in e-mail. The present embodiments are therefore to be considered in all respects as illustrative and not restrictive, the scope of the invention being indicated by appending claims rather than by the foregoing description, and all changes that come within the meaning and range of equivalency of the claims are therefore intended to be embraced therein.

What is claimed is:

1. A system for recognizing a particular pattern formed by a plurality of bytes in a stream of bytes, said system operating in a series of states, and said system including:
   a plurality of lookup tables, one for each of said plurality of bytes, each lookup table having a section associated with each state;
   a first index table which has index data associated with each state, the index data associated with each state comprising a plurality of index bits; and
   a next state table which has a data word associated with each state, each data word having data that specifies the next state and/or a special flag,
said system performing the following steps in each particular state of a series of states;
   a) interrogating a particular section of each lookup table utilizing the value of the associated bytes to determine the value of a series of bits, said particular section of each lookup table being determined by the particular state;
   b) generating a pointer from a combination of the value of the series of bits determined by said lookup tables and the bits in current state location in said first index table, said pointer specifying the address of a particular data word in said next state table;
   c) reading the particular data word specified by the pointer generated in step "b" and based on the contents of said data word proceeding to the next state specified by said data word and/or performing special operations in response to said flag; and
   d) repeating steps "a", "b" and "c" until an end of operation is indicated by said flag.

2. The system recited in claim 1 wherein all of said plurality of bytes are used to interrogate said lookup tables in parallel.

3. The system recited in claim 1 wherein those bytes that cause the same transition are grouped into classes whereby multiple bytes can be represented by a single class, each class having a single entry in any particular single section of said table.

4. The system recited in claim 3 wherein the bits generated by any lookup table depends upon the number of character classes of the associated byte.

5. The system recited in claim 1 wherein at each state, each lookup table generates a series of bits, the particular series of bits generated being dependent upon the particular value of the associated byte.

6. The system recited in claim 5 wherein said lookup tables generate a variable number of bits depending upon the particular state of operation.

7. The system recited in claim 5 wherein the bits generated by said plurality of lookup tables are concatenated together and then concatenated with said value from said first index table.

8. The system recited in claim 5 wherein the bits generated by said plurality of lookup tables and said value from said first index table are combined to form the address of a location in said next state table.

9. The system recited in claim 1 wherein said data stream comprises a stream of bytes that form a data packet, said particular operation is the recognition of a particular pattern of bytes in a data packet and wherein a signal is given when said pattern is recognized.

10. The system recited in claim 9 wherein when a particular pattern of bytes is recognized, said operation continues to another state to find another occurrence of said pattern of bytes in said packet.

11. The method recited in claim 10 wherein said method utilizes a mask with one bit for each of said plurality of bytes in a data packet, and said steps including an initial step of selecting bits for processing utilizing said mask.

12. The system recited in claim 1 wherein the series of bits generated by each lookup table has a number of bits that can vary from state to state.

13. The system recited in claim 1 wherein said system includes four lookup tables.

14. The system recited in claim 1 wherein each of said tables has 256 entries for each state.

15. The system recited in claim 1 wherein said system includes a number of lookup tables which is a multiple of four.

16. The system recited in claim 1 wherein each of said lookup tables has a number of entries equal to the values in the alphabet used by said bytes.

17. The system recited in claim 1 wherein said system includes a mask with one bit for each of said plurality of bytes in a data packet, and said steps including an initial step of selecting bits for processing utilizing said mask.

18. The method of recognizing a particular pattern formed by a plurality of bytes in stream of bytes, said method operating in a series of states, and utilizing:
   a plurality of lookup tables, one for each of said plurality of bytes, each lookup table having a section associated with each state;
   a first index table for storing a plurality of index bits associated with each particular state; and
   a next state table for storing data words, each of which indicates the next state and/or a special operation flag,
said method including the following steps in each particular state in a series of states;
   a) interrogating a particular section of each lookup table utilizing the value of the associated byte to determine the value of a series of bits, said particular section of each lookup table being based on the particular state;
   b) generating a pointer which specifies the address of a data word in said next state table from a combination of the selected values from the lookup tables and a value from the first index table associated with the particular state;
   c) reading the particular data work specified in step "b" and based on the contents of said data word proceeding to the next state and/or performing operations indicated by a flag in said data work; and
   d) repeating steps "a", "b" and "c" until a flag in said next state table indicates an end of the operation.

19. The method recited in claim 18 wherein all of said plurality of bytes are matched with data in said lookup tables in parallel.

20. The method recited in claim 18 wherein those bytes that cause the same transition are grouped into classes whereby multiple bytes can be represented by a single class, each class having a single entry in a section of said table.

21. The method recited in claim 18 wherein at each state, each lookup table generates a series of bits, the particular series of bits generated being dependent upon the particular value of the associated byte.

22. The method recited in claim 21 wherein said tables generate a variable number of bits depending upon the particular state of operation.

23. The method recited in claim 21 wherein the bits generated by said plurality of lookup tables are concatenated together and then concatenated with said value from said first index table.

24. The method recited in claim 18 wherein the bits generated by any lookup table depends upon the class of the associated byte.

25. The method recited in claim 18 wherein said classes are a compressed representation of the alphabet used in said state machine.

26. The method recited in claim 18 wherein the series of bits generated by each lookup table has a number of bits that can vary from state to state.

27. An integrated circuit for recognizing a plurality of characters in parallel, said integrated circuit operating in series of states, and said integrated circuit including:
   a plurality of lookup tables, one for each of said characters, each lookup table having a section associated with each state;
   an index table for storing a plurality of index bits for each state; and
   a next state table for storing data words, each of which indicates the next state of said state machine,
said integrated circuit performing the following steps in a plurality of particular states;
   a) interrogating the section of said lookup table associated with said particular state and generating a series of bits based on the value of the associated character;
   b) generating a pointer which specifies the address of a data word in said next state table from a combination of the selected values from the lookup tables and a value from said first index table;
   c) reading the particular data word specified in step "b" and proceeding to the state specified by said data word; and
   d) repeating steps "a", "b" and "c" until said operation ends.

28. The integrated circuit recited in claim 27 wherein the number of bits generated by said lookup tables and the number of bits in the value from said current state table vary by state, and the total number of bits is the same in all states.

29. The inegrated circuit recited in claim 27 wherein there are four lookup tables and four characters are evaluated in parallel.

30. A method for evaluating in parallel a plurality of characters in a stream of bytes, said method operating in a series of states and utilizing a set of alphabet lookup tables, one lookup table for each of said plurality of characters, each lookup table having a section associated with each of said states, and a next state table, said method comprising:
   a) selecting an alphabet lookup table from said set of alphabet tables, as a function of a current state and byte position within said set of bytes, and obtaining a class code from said selected alphabet table corresponding to the character represented by said byte;
   b) selecting a value from said next state table as a function of the current state, and generating an indication of the next state from said class codes of said set of bytes and from said value from said next state table; and
   c) repeating steps "a" and "b" until said state machine arrives at acceptance state or until entering a failure state.

31. A system for recognizing a particular pattern formed by a number of bytes in a stream of bytes, said number being at least one, said system operating in a series of states, and said system including:
   a lookup table for each byte in said number of bytes, each lookup table having a section associated with each state;
   a first index table which has index data associated with each state, the index data associated with each state comprising a plurality of index bits; and
   a next state table which has a data word associated with each state, each data word having data that specifies the next state and/or a special flag;
said system performing the following steps in each particular state of a series of states;
   a) interrogating a particular section of each lookup table utilizing the value of each of said bytes to determine the value of a series of bits, said particular section of each lookup table being determined by the particular state;
   b) generating a pointer from a combination of the series of bits generated by the lookup tables and bits in the current state location in said first index table, said pointer specifying the address of a particular data word in said next state table;
   c) reading the particular data word specified by the pointer generated in step "b" and based on the contents of said data word proceeding to the next state specified by said data word and/or performing special operations in response to said flag; and
   d) repeating steps "a", "b" and "c" until an end of operation is indicated by said flag.

* * * * *